US008400157B2

(12) United States Patent
Kuzmin et al.

(10) Patent No.: US 8,400,157 B2
(45) Date of Patent: *Mar. 19, 2013

(54) BUCKING COIL AND B-FIELD MEASUREMENT SYSTEM AND APPARATUS FOR TIME DOMAIN ELECTROMAGNETIC MEASUREMENTS

(75) Inventors: Petr Valentinovich Kuzmin, Aurora (CA); Edward Beverly Morrison, Newmarket (CA)

(73) Assignee: Geotech Airborne Limited, St. Michaeal (BB)

( * ) Notice: Subject to any disclaimer, the term of this patent is extended or adjusted under 35 U.S.C. 154(b) by 1211 days.

This patent is subject to a terminal disclaimer.

(21) Appl. No.: 12/201,305

(22) Filed: Aug. 29, 2008

(65) Prior Publication Data

US 2010/0052685 A1     Mar. 4, 2010

(51) Int. Cl.
*G01V 3/16* (2006.01)
(52) U.S. Cl. ........................................ 324/331
(58) Field of Classification Search .......... 324/330–331, 324/365
See application file for complete search history.

(56) References Cited

U.S. PATENT DOCUMENTS

| 7,148,690 | B2 | 12/2006 | Hollis |
| 7,157,914 | B2 | 1/2007 | Morrison et al. |
| 2003/0155998 | A1 | 8/2003 | Takeshima et al. |
| 2003/0169045 | A1 | 9/2003 | Whitton |
| 2004/0207403 | A1 | 10/2004 | Fanini et al. |
| 2005/0001622 | A1 | 1/2005 | Morrison et al. |
| 2006/0197531 | A1 | 9/2006 | Hollis |
| 2011/0148421 | A1* | 6/2011 | Kuzmin et al. ............... 324/330 |

FOREIGN PATENT DOCUMENTS

WO          2007045963          4/2007

OTHER PUBLICATIONS

International Search Report and Written Opinion issued in a corresponding case, dated Dec. 11, 2009.
Smith, R.S., Annan, A.P.: "Using an Induction Coil Sensor to Indirectly Measure the B-filed Response in the Bandwidth of the Transient Electromagnet Method", GEOPHYSICS, Oct. 2000, pp. 1489-1494, vol. 65, XP000002658207.
The Extended European Search Report issued in a corresponding European application dated Sep. 5, 2011.

* cited by examiner

*Primary Examiner* — Bot Ledynh
(74) *Attorney, Agent, or Firm* — Novak Druce Connolly Bove + Quigg LLP

(57) ABSTRACT

The present invention relates to a HTEM system that includes a semi-rigid bucking coil and an algorithm to determine the magnetic field B from the measured signal dB/dt. The bucking coil may be positioned in a concentric coplanar manner relative to a transmitter coil and receiver coil, in order to minimize spurious signals at the receiver coil during data acquisition time. Signals gathered by the system may be further processed by a signal processing means. Moreover, measurements performed upon data generated by the system may be performed upon the entire period of a current waveform applied to the transmitter and bucking coils.

19 Claims, 6 Drawing Sheets

BUCKING COIL AND B-FIELD MEASUREMENT SYSTEM AND APPARATUS FOR TIME DOMAIN ELECTROMAGNETIC MEASUREMENTS

FIELD OF INVENTION

This invention relates in general to the field of geophysical electromagnetic measurements and more particularly to a method and system of obtaining a B-field using time domain electromagnetic measurements generated by way of an apparatus including a bucking coil and a signal processing means.

BACKGROUND OF THE INVENTION

Geophysical electromagnetic (EM) techniques may be effective in the determination of the electrical conductivity of soils, rocks and other conductive material at depths from the surface up to about three kilometers. Conductivity distribution at such depths is of great interest to those involved in mapping base metal and uranium deposits, aquifers and other geological formations.

Geophysical EM methods involve measurement of time-varying magnetic fields near the earth's surface produced by a primary magnetic field and modeling of the ground conductivity distributions. These magnetic fields are generated either by a periodic current applied to a transmitter, or by naturally occurring electromagnetic fields originating mainly from lightning in the earth's atmosphere. EM fields can have a characteristic ground penetration depth proportional to the inverse of the square-root of both ground conductivity and frequency.

In known methods, the magnetic field signal is measured using either a receiver coil system (which can measure up to three orthogonal components of the magnetic field time-derivative dB/dt), or a magnetometer (which measures the magnetic field B). The received analog signal is then amplified, filtered, and digitized by a high-resolution high-speed analog-to-digital converter (ADC), and the data may be stored along with the positioning information obtained from a Global Positioning System (GPS). Data post-processing involves electrical and physical modeling of the ground to generate the geophysical conductivity contour maps.

Existing geophysical surveying methods typically require high signal-to-noise ratio (SNR), high conductivity discrimination, and high spatial resolution both laterally and in depth. A preferred EM method, known as a time-domain electromagnetic (TDEM) measurement, depends on ground conductivity and the desired probing depth. TDEM measurements can probe targets at depths up to 1 km in the conductivity range from about 10 mS/m to 10 S/m.

Other known techniques, such as Frequency-Domain Electromagnetic (FDEM) measurements, can provide well calibrated measurements at depths up to about 100 m in the conductivity range 1 mS/m to 1 kS/m. Audio Frequency Magnetic (AFMAG) measurements can measure targets at depths up to 3 km in the conductivity range 0.1 mS/m to 1 S/m with high conductivity contrast.

Furthermore, existing EM systems encompass both ground-based and airborne measurements. Airborne measurements are collected through the use of airplanes and helicopters. Airborne methods are preferred for large area surveys and may be used for exploration of conductive ore bodies buried in resistive bedrock, geological mapping, hydrogeology, and environmental monitoring. Known airborne electromagnetic (AEM) systems function so that the data is acquired while the airplane or helicopter flies at nearly constant speed (e.g. up to 75 m/s or 30 m/s, respectively) along nearly-parallel equally-spaced lines (e.g. 50 m to 200 m) at close to constant height above ground (e.g. about 120 m or 30 m, respectively). Measurements are taken at regular intervals, typically in the range 1 m up to 100 m.

Fixed-wing airplane AEM systems specifically can carry large transmitter coils and are capable of deeper investigation of discrete conductors, such as base metal and uranium deposits, while helicopter frequency-domain electromagnetic systems are effective in near-surface mapping with high near-surface resolution, although limited depth penetration. Over the last decade, the key drive in geophysical surveying has been to develop helicopter-mounted time-domain electromagnetic (HTEM) systems.

An additional feature of known EM measurements is that they can be achieved either in the frequency domain or time domain. In FDEM measurements, the transmitter coil continuously transmits an electromagnetic signal at fixed multiple frequencies, while the receiver coil measures the signal continuously over time. The measured quantities are signal amplitude and phase as a function of frequency, or equivalently, the in-phase and in-quadrature amplitudes as a function of frequency. In these measurements, the signal sensitivity is reduced with increasing conductivity, thus reducing the conductivity contrast mapping.

In the course of collecting time TDEM measurements by known methods, a pulse of current is applied to the transmitter coil during an on-period and switched off during the off-period, typically at a repetition rate equal to an odd multiple of half of the local power line frequency (e.g. typically 50 Hz or 60 Hz). The signal is measured at the receiver as a function of time. The signal amplitude decay during the off-period, combined with modeling of the conductivity and geometry of geological bodies in the ground, yields the conductivity contour maps.

In known TDEM systems, during the current-on-period, weak conductors produce weak dB/dt signals at the receiver coil while good conductors produce large in-phase signals, although quite small compared to the unwanted primary EM field generated by the transmitter coil system. During the current-off-period, weak conductors produce a large dB/dt signal at the receiver coil from a rapidly decaying EM field while good conductors produce small signals from a slowly decaying EM field. Measurements are typically made during the off-period, and while measurement of dB/dt is preferable to map weak conductors, the measurement of the magnetic field, referred to as the B-field, can increase the accuracy of information provided for good conductors.

In known methods the magnetic field B can be obtained either by direct measurement using a magnetometer or by time-integrating the signal dB/dt measured with a receiver coil. When the magnetic field B is to be obtained by integration, the dB/dt response over the full waveform has to be measured including during the on-period, in order to determine the integration constant that provides a zero DC component over the entire period (see Smith, R. S. and Annan A. P., "Using an induction coil sensor to indirectly measure the B-field response in the bandwidth of the transient electromagnet method", Geophysics, 65, p. 1489-1494).

An HTEM system is provided by Geotech, known generally by the name VTEM (Versatile Time-Domain Electromagnetic). In addition to this system, several other systems are also available from other companies. These include: AeroTEM by Aeroquest Ltd., THEM by THEM Geophysics Inc., HoisTEM by Normandy Exploration Ltd., NewTEM by Newmont Mining Corp., ExploHEM by Anglo American, SkyTEM by SkyTEM ApS., and HeliGEOTEM by Fugro Airborne Survey.

Some of the commercially available geophysical airborne time-domain EM systems can measure the B-field, such as MegaTEM, and HeliGeoTEM. All of these systems are deployed with transmitter and receiver coils that are physically separated by a large distance, typically in the range 30 m to 150 m. Currently, the only commercially available concentric dipole HTEM system, other than VTEM, is AeroTEM. However, this system does not determine the B-field, but merely outputs the dB/dt signal at the receiver coil during part of the transmitter coil on-time, in addition to the standard off-time measurement.

The prior art generally experiences problems affecting the accuracy of existing systems. For example, acquiring data over the entire period in a concentric dipole HTEM system can be challenging since the signal during the on-period is typically many orders of magnitude higher than during the off-period. As the dynamic range is dictated by the ratio of the signal strength at the receiver coil during the on-period and the off-period of the transmitter coil current, one possible solution is to increase the physical separation between the transmitter and the receiver coils. This large distance has the effect of decreasing the requirement for a large dynamic range for the data acquisition system. However, the separation imposed by the large distance introduces negative characteristics such as loss of spatial resolution or a system that is unwieldy and difficult to tow in flight, especially by helicopter.

Another possible solution to the dynamic range issue is to implement a bucking coil to decrease the amplitude of the primary field at the receiver. Existing prior art that uses a bucking coil is generally restricted to EM measurements in the frequency-domain and has not been implemented for measurement in time-domain. Known methods of achieving frequency-domain EM measurements require a mechanically rigidly mounted bucking coil relative to the transmitter coil and the receiver coil in order to minimize the spurious signals at the receiver coil during data acquisition time caused by the changing geometry of the transmitter, and the bucking and receiver coils. The prior art encounters multiple problems such as, for example, structural vibrations of the coils produced during flight by wind buffeting or aircraft machinery, resulting in spurious signals at the receiver coil with a wide frequency spectrum.

What is needed is a system capable of probing mineral deposits at depths approaching one kilometer and detecting good conductors in the ground, that overcomes the flaws inherent in the prior art.

SUMMARY OF THE INVENTION

In one aspect, the present disclosure relates to a HTEM system to produce a B-field measurement comprising: a transmitter coil; a bucking coil positioned in a substantially concentric and coplanar orientation relative to the transmitter coil; a receiver coil positioned in a substantially concentric and coplanar orientation relative to the bucking coil; an electrical current connected to the transmitter coil and bucking coil; and wherein a dB/dt signal is produced by the receiver coil for generation of a B-field measurement.

In another aspect, the present disclosure relates to an electromagnetic measurement data acquisition system comprising: a receiver coil positioned within a bucking coil which is further positioned within a transmitter coil, each coil being substantially concentric to the other said coils and being electrically connected, whereby a receiver coil signal is obtained; a low-noise pre-amplifier whereby the receiver coil signal is amplified to produce a dB/dt signal; a low-pass anti-aliasing filter whereby the dB/dt signal may be filtered; an ADC whereby the filtered signal may be digitized; and a signal processing means, included in the system or linked to the system, to produce a B-field measurement.

In yet another aspect, the present disclosure relates to a signal processing method to produce a B-field measurement comprising: obtaining a receiver coil signal from a receiver coil positioned within a bucking coil which is further positioned within a transmitter coil, each coil being positioned in substantially concentric orientation relative to the others and being electrically connected with one another to produce the receiver coil signal; continuously digitizing the receiver coil signal by way of a ADC that filters the signal; obtaining the digitized signal by a signal processing means unit; eliminating pre-amplifier set-off and temperature-dependent drifts by averaging the signal at a given point of a waveform point-by-point over a set of periods; averaging the waveform over one or more positive and negative semi-periods or signals to obtain an off-set signal; optionally subtracting a resulting digital signal from each point; integrating the digital signal over at least one entire period so as to produce the B-field measurement; and binning the digital signal into gates with substantially equal time intervals in a logarithmic scale.

In another aspect, the present disclosure relates to an electromagnetic measurement apparatus comprising: a transmitter coil; a bucking coil positioned substantially centrally within the transmitter coil; a receiver coil positioned substantially centrally within the bucking coil; a system of one or more radial cables whereby the transmitter coil, bucking coil and receiver coil are connected in their relative positions; an external suspension system of one or more external cables releasably connected to the transmitter frame; and one or more suspension attachment cables attached to the external suspension system; wherein the transmitter coil, bucking coil and receiver coil are positioned substantially concentrically relative to one another when the attachment cable is lifted vertically to a sufficient height to suspend the transmitter coil, bucking coil and receiver coil and the coils are positioned so as to function to achieve electromagnetic measurements whereby time domain B-field measurements are derived.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
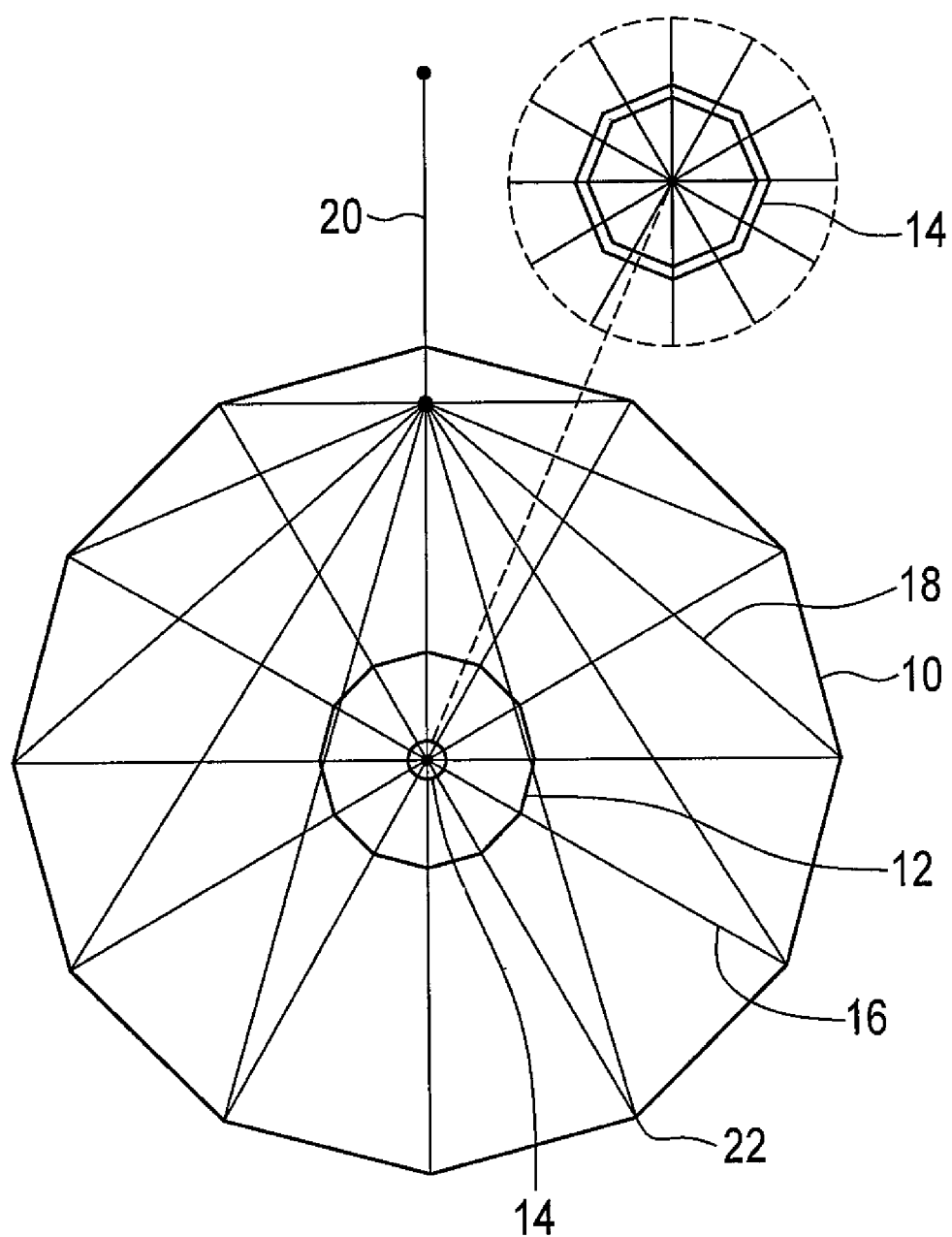
FIG. 1 is a view of the HTEM system of the present invention including an exploded view of the receiving coil.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention relates to a HTEM system that includes a semi-rigid bucking coil and means for determining the magnetic field B from the measured signal dB/dt. The bucking coil may be positioned in a concentric coplanar manner relative to a transmitter coil and receiver coil, in order to minimize spurious signals at the receiver coil during data acquisition time. Signals gathered by the system may be further processed by a signal processing means. Moreover, measurements performed upon data generated by the system may be performed upon the entire period of a current waveform applied to the transmitter and bucking coils.

The addition of a bucking coil can increase the suspension mechanical complexity and structure weight, but has the advantage of keeping the signal within the ADC dynamic range. The positioning and stability of the bucking coil is made possible by the present invention by placing the bucking coil at the centre of the main transmitter coil in order to minimize the magnetic field at the receiver coil. Deviations in the position of the bucking coil and receiver coil from the ideal concentric configuration produce a spurious DC signal, thus reducing the signal dynamic range. Mechanical motion of the transmitter coil and bucking coil also result in reduced SNR at the receiver coil.

The means for determining magnetic field B may be implemented as a software utility, running on a computer linked to or part of the HTEM system that uses an algorithm such as the known algorithm described below. It should also be understood that the computer and associated software utility may be used in a processing phase after collection of the field data.

Measurement of the B-field can aid the probing of mineral deposits at depths approaching one kilometer and the detection of good conductors in the ground. Embodiments of the present invention may apply a small magnetic dipole moment with fast turn-off, as is appropriate for surveys mapping near-surface conductivity. This aspect of the invention can affect the transmitter coil and decrease the required number of turns in the transmitter coil to yield a reduced magnetic dipole moment and inductance. Conversely, for the detection of conductors at greater depths, the present invention may increase the transmitter coil magnetic dipole moment and to have a longer off-period.

The present invention overcomes several problems encountered in the prior art. The application of a bucking coil has the advantage of reducing the requirement of the ADC dynamic range. The effect of this reduction may be to allow for the measurement to include the entire period of the current waveform applied to transmitter and bucking coils, or over an increased period of said current waveform. Acquiring data over the entire transmitter current period can be challenging since the signal during the on-period is typically many orders of magnitude higher than during the off-period. Thus, the present invention provides a beneficial EM tool.

Embodiments of the present invention may offer the additional advantage of incorporating a concentric dipole HTEM system, such as for example a VTEM system, in the invention. The HTEM system elements in the present invention may simplify data analysis. Specifically, such an embodiment of the present invention may facilitate the positioning of the bucking coil at the centre of the main transmitter coil. This positioning can increase the stability of the bucking coil and can minimize the magnetic field at the receiver coil. Deviations in the position of the bucking coil and the receiver coil from an ideal concentric configuration of the present invention may produce a spurious DC signal, and therefore require a larger signal dynamic range. Mechanical motion of the bucking coil may also result in a lower SNR measurement at the receiver coil. The positioning of the bucking coil with an HTEM system of the present invention can increase the accuracy of the measurements.

A typical setup of the HTEM system may be to have the transmitter and receiver coil in a substantially concentric and substantially coplanar configuration. This concentric configuration can allow for a smaller setup and may offer superior symmetry for the scattering response, which in turn may allow for easier interpretation of the scatterer geometry and better lateral resolution. For concentric dipole HTEM systems, the dynamic range required for the pre-amplifier and the ADC may be typically in the range 120 dB, dictated by the ratio between the maximum signal amplitude and the input noise of the pre-amplifier.

In concentric dipole HTEM systems, to increase the dynamic range, one can place the receiver coil several meters above the transmitter coil to reduce the signal produced by the transmitter coil at the receiver. Alternatively, one can either use an auto-scaling pre-amplifier or switch the pre-amplifier gain between low-gain during the on-period and high-gain during the off-period. Use of adjustable gain amplifiers makes data acquisition more complex, but has the advantage of keeping the transmitter and receiver coils concentric, thus minimizing anomalous mapping profiles. For example, for a 40 dB adjustable gain pre-amplifier, a 16-bit ADC is sufficient to digitize the signal, whereas, if a 24-bit ADC is used, the system may apply a fixed gain pre-amplifier.

Sources of electrical noise at the receiver coil are numerous. The spurious signals may be produced by several sources that cause noise, such as: both the helicopter and other metallic parts of the system; lightning activity in the atmosphere; local AC power line interference; VLF radio waves in the 15-25 kHz frequency range; and thermal noise from the coil and the electronics. However, at low frequencies, for example, such as 0-100 Hz, the main source of noise at the airborne receiver coil is the microphonic noise produced by the motion of the coil in the magnetic field of the earth. The motion is produced by wind buffeting of the coil, vibration from the aircraft, and/or rubbing of the coil against the coil suspension system.

The potential means of increasing signal-to-noise ratio (SNR) at the receiver coil may not be straightforward due to the multiple factors that may affect the measurement. In order to minimize the noise produced in the frequency range of interest by various sources, it may be necessary to apply one or more of the following to embodiments of the invention: a reduction in the movement of the receiver coil relative to the magnetic field of the earth; prevention of external mechanical noises from reaching the receiver coil; and minimization of the mechanical noises produced by the receiver coil suspension system.

In an embodiment of the present invention a semi-rigid structure may be applied to build a large transmitter coil and bucking coil with an inherently large magnetic dipole moment and improved SNR. Larger structures, combined with the external suspension system, may also be utilized in embodiments of the present invention to improve flight stability and reduce the SNR requirements.

As shown in FIG. 1, the HTEM may be a dodecagonal bucking coil frame 12 of a size for example, such as approximately 6.5 m (also shown in FIG. 4). This coil frame may be positioned at, or near, the centre of the dodecagonal main transmitter coil frame 10, for example, of a size such as approximately 26.0 m. A receiver coil frame 14 may be further positioned at the centre of the bucking coil frame 12. The three coils may be connected by a system of radial cables 16, for example, such as approximately twelve radial cables. Each coil may be further attached to an external suspension system formed of external cables 18 each cable being releasably connected to the corners 22 of the polygonal transmitter and bucking coil frames. In another embodiment of the present invention, the external suspension system may be formed of cables configured into a mesh. The external suspension system 18 may be additionally attached to one or more suspension attachment cables 20. The suspension attachment cable may further be releasably attached to a helicopter, whereby the system of frames may be towed by the helicopter.

Figure 2:
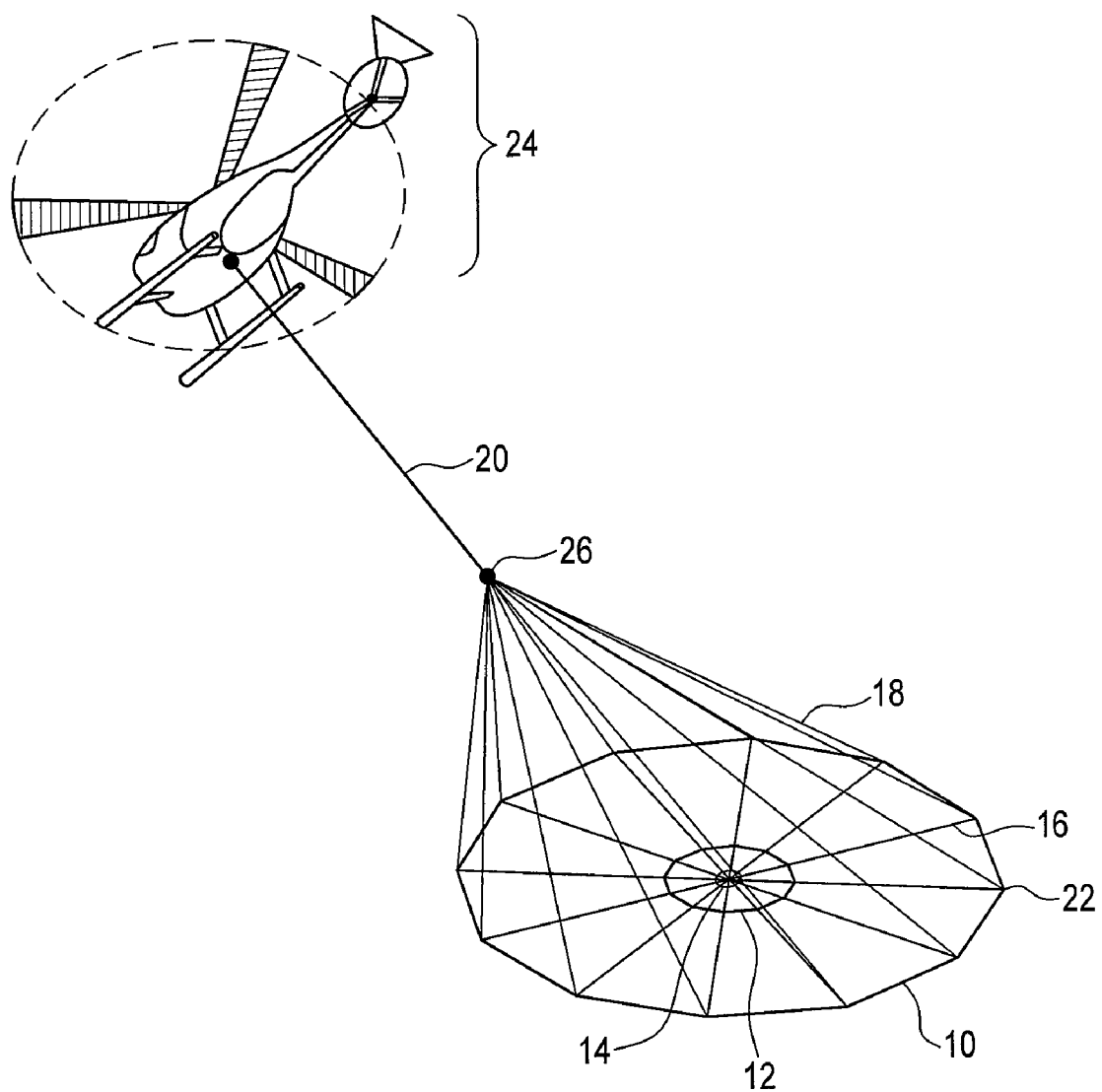
FIG. 2 is a side-view of the HTEM system of the present invention in flight.

As shown in FIG. 2, in one embodiment of the present invention the HTEM system of frames, including the main transmitter coil frame 10, bucking coil frame 12 and receiver coil frame 14, may be suspended in flight towed by a helicopter 24 flying at a constant surveying speed. The constant surveying speed may, for example, be a speed such as approximately 30 m/s. In this particular embodiment the transmitter coil 10 may be supported by an external mesh suspension system 18 such as from a point that may be a distance away from the centre of the coil. The distance may be, for example, such as, approximately 1 m away from the coil centre. The suspension point 26 where the cables of the suspension system 18 meet, may be attached to the helicopter by a long suspension attachment cable 20. The attachment cable 20 may have a length of for example, such as, approximately 41 m. The external mesh suspension 18 may be formed such that during flight the coils may be positioned to be horizontal or substantially horizontal. The suspension attachment cable 20 may be positioned at an angle from the vertical. For example, the suspension attachment cable 20 may be positioned at angle from the vertical, such as, approximately 35 degrees. This embodiment of the present invention may have a structure capable of maintaining a horizontal or substantially horizontal position during flight. This in-flight position may be achieved through a consideration of several factors, including the drag produced by the wind, the weight of the structure and the external suspension meshes.

Figure 3:
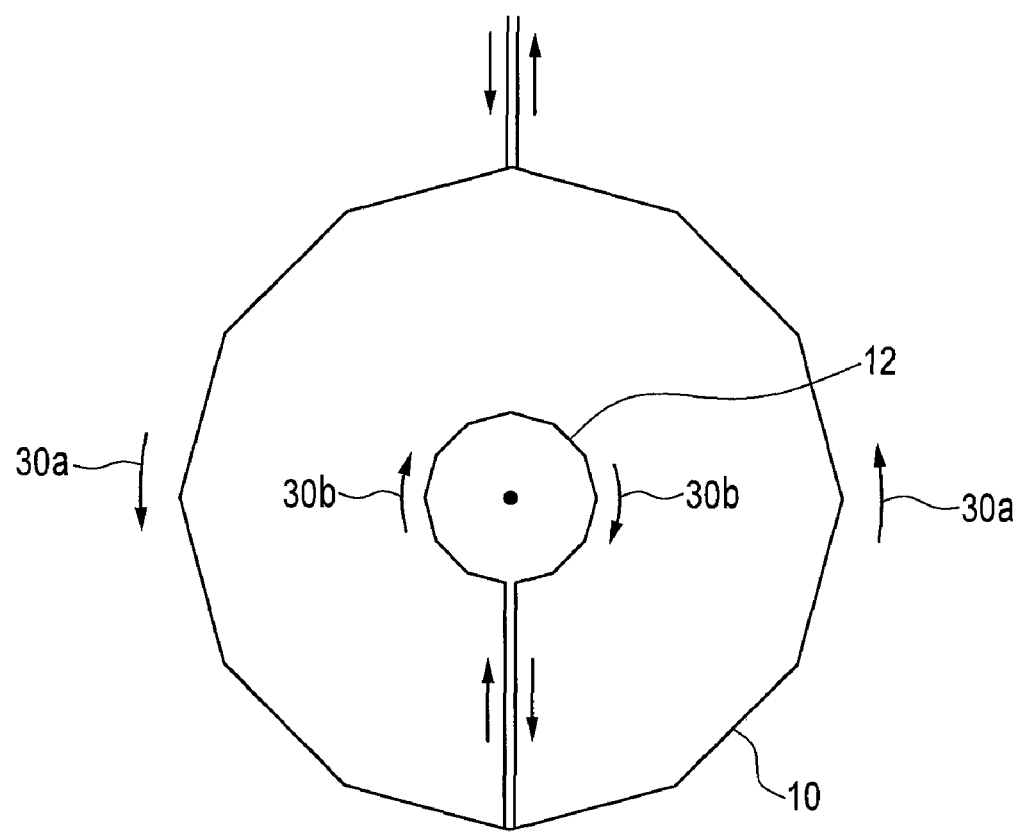
FIG. 3 is top-view of the transmitter coil and bucking coil electrical connections.

As shown in FIG. 3, in one embodiment of the present invention, the main transmitter coil 10 may be an overall size, for example, such as approximately 26 m. The main transmitter coil 10 may additionally encompass four turns of wire. Such turns may be positioned inside the transmitter coil frame. In the same embodiment of the present invention the bucking coil 12 may be an overall size, for example, such as approximately 6.5 m. The bucking coil 12 may additionally encompass one turn of wire positioned inside the bucking coil frame. A skilled reader will recognize that the number of turns incorporated in the transmitter coil or bucking coil are provided mentioned above are provided solely as examples. The turns in the transmitter coil and bucking coil may be fewer or greater than the number suggested in accordance with the requirements of specific embodiments of the present invention, or specific applications of the present invention.

The bucking coil 12 and main transmitter coil 10 may be electrically connected. This electrical connection may be achieved in series, having currents circulating in opposite directions 30a, 30b. The magnetic field at the centre of a coil is proportional to current direction and the number of wire turns, and inversely proportional to the overall diameter of the coil. For a concentric transmitter and bucking coils the primary magnetic field measured at the receiver coil placed at the centre of these coils may be approximately zero, as for each coil, the current times the number of wire turns divided by the coil radius is approximately the same.

In one embodiment of the present invention, encompassing a rigid structure, having a magnetic field at the centre of the coplanar transmitter coil and bucking coil close to zero can be advantageous because the magnetic field can increase rapidly away from the centre. Consequently, if the transmitter and bucking coils are not concentric with the receiver coil, an unwanted background primary magnetic field may be produced at the receiver coil. It is desirable therefore that said coils be concentric or substantially concentric. Another consideration relating to the measurement is that the lack of stability during flight produces a strong spurious signal at the receiver coil because the primary magnetic field is many orders of magnitude larger than the secondary magnetic field during the on-period.

To allow for the use of a semi-rigid bucking coil structure to reduce background magnetic field at the receiver coil during the on-period, when the EM measurements are made in time-domain, the signal averaged over several periods should be zero. This may be necessary since the primary field produced by the transmitter coil and the bucking coil at the receiver coil should be zero. If a non-zero signal average is measured, this value may be subtracted from the measured signal. This feature may result in a reduction of the requirements for a large signal dynamic range.

Figure 4A:
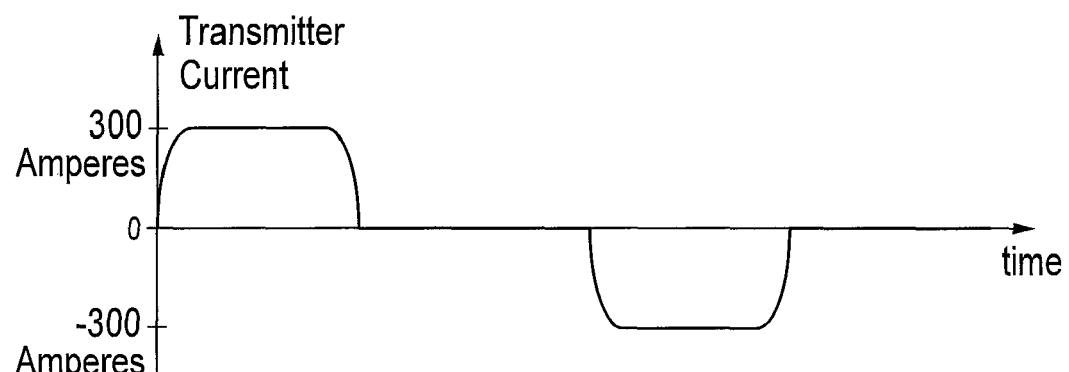
FIG. 4A is a graph-view of a current waveform applied to the transmitter coil and bucking coil.

As shown in FIG. 4A, in one embodiment of the present invention an electric current may be applied to the transmitter and bucking coils. These coils may be connected in series, as shown in FIG. 3. The current is a positive on-period and an off-period, followed by a negative on-period and an off period. In one embodiment of the present invention, the current waveform 34 may be symmetrical with a zero, or substantially zero, DC component, an approximate frequency of 30 Hz and approximate peak amplitude of 300 A. A skilled reader will recognize that other waveforms may be utilized in alternate embodiments or applications of the present invention.

Figure 4B:
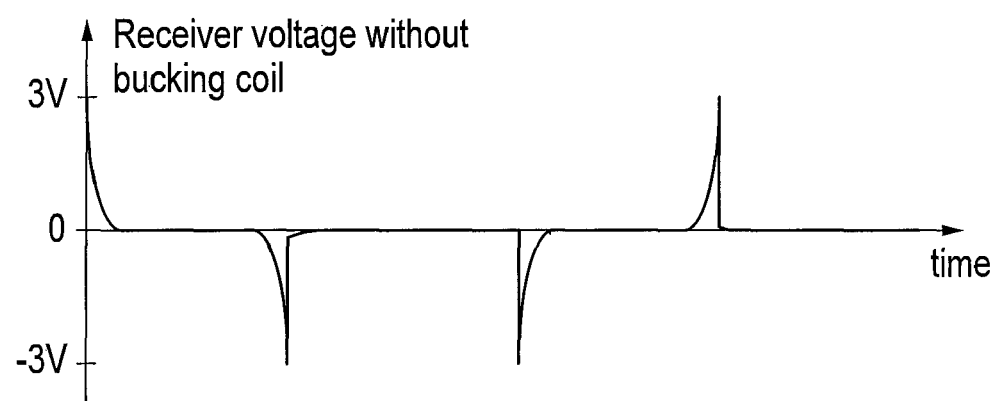
FIG. 4B is a graph-view of a current waveform measured at the receiver coil of a system that does not include a bucking coil.
Figure 4C:
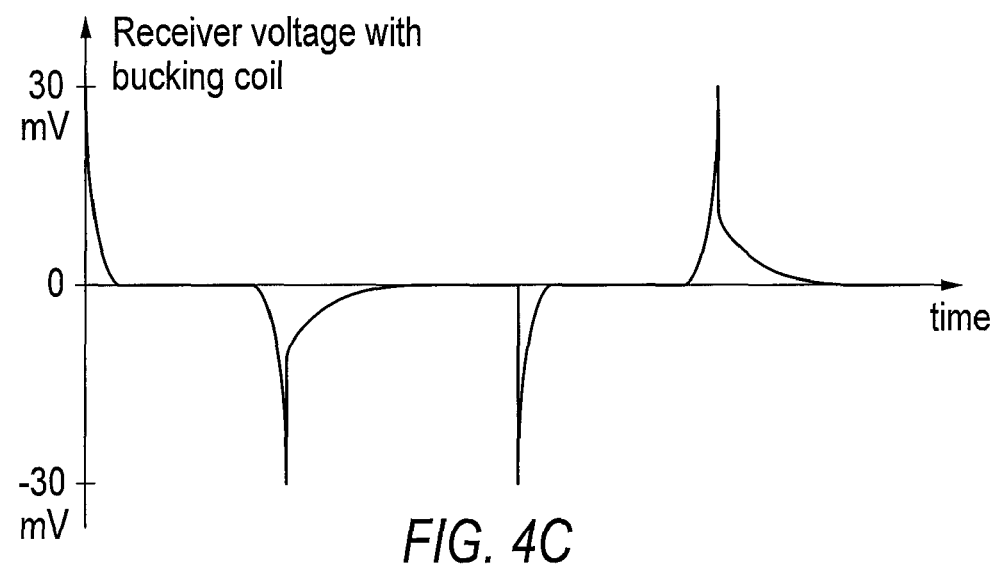
FIG. 4C is a graph-view of a current waveform measured at the receiver coil of a system that includes a bucking coil.

In another embodiment of the present invention the dB/dt voltage signal at the receiver coil may be utilized, as shown in FIG. 4B. In this embodiment the on-period signal amplitude may be approximately 3V without a bucking coil. The introduction of the bucking coil may cause the signal to be reduced to approximately 30 mV as shown in FIG. 4C. The transmitter off-period signal may have amplitude about 30 mV. Additionally, the bucking coil may have the effect of reducing the on-period signal to approximately the same level as the off-period signal, thus allowing for the SNR to be maximized by amplifying the receiver coil signal. The maximum amplification can be limited by the ADC input signal range. A skilled reader will recognize that other signals may be utilized in embodiments of the present invention.

Figure 5:
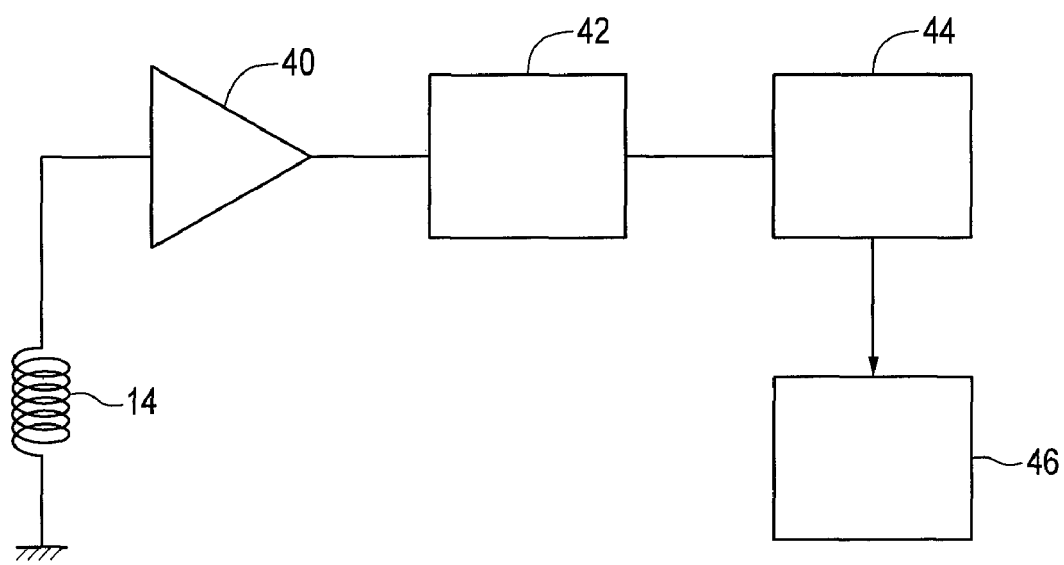
FIG. 5 is a schematic-view of the data acquisition system of the present invention.

In yet another embodiment of the present invention, a data acquisition system may be incorporated, or linked to the apparatus of the present invention, such as that shown in FIG. 5. In this embodiment, the receiver coil 14 signal may be amplified, for example, such as approximately 100 times, by a low-noise pre-amplifier 40. This may produce a peak-to-peak signal, for example, such as an approximately 6V peak-to-peak signal. The signal may then be filtered by a low-pass anti-aliasing filter 42, for example, such as a filter of approximately 30 KHz. It may additionally be digitized by a bipolar ADC 44, for example, such as a 24-bit ADC, at a set rate, for example, such as a rate of approximately 100K or 200K samples per second. The data extracted through the digitization may then be passed to a processing and storing unit 46 capable of digitally processing and storing the data. A skilled reader will recognize that the amplification and other measurements provided are offered by way of example only, and that other amplifications and measurements may be utilized in embodiments of the present invention.

Figure 6:
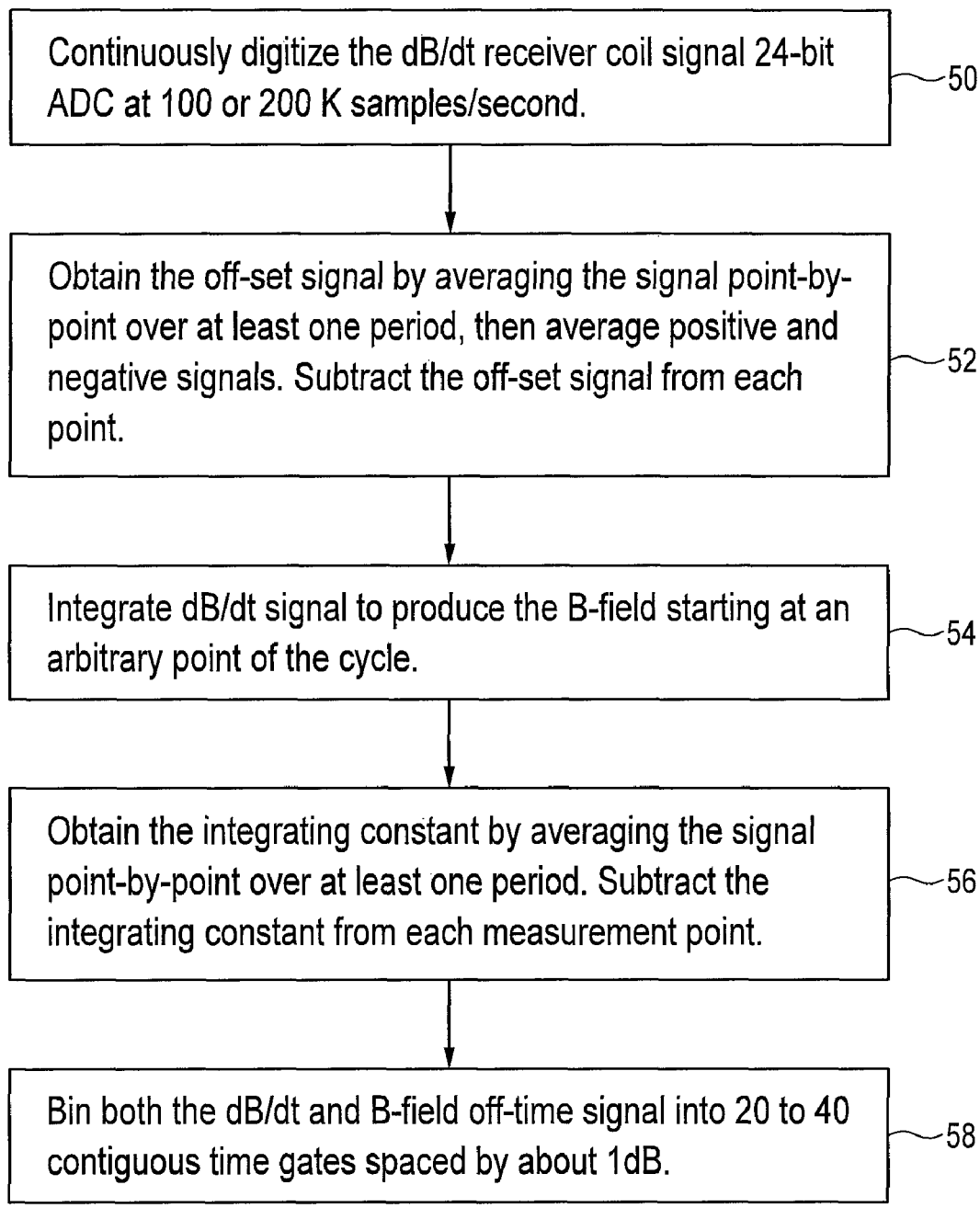
FIG. 6 illustrates the data analysis flow of the present invention to determine the B-field.

One embodiment of the present invention may include a signal processing means such as that shown in FIG. 6. In such an embodiment, the receiver coil signal may be received from the bipolar ADC of FIG. 5 whereby it may be continuously digitized 50. This digitization may, for example, occur at a rate such as 24-bit ADC at 100K to 200K samples per second. To eliminate the pre-amplifier off-set and temperature-dependent drifts, the signal at a given point of the waveform may be averaged point-by-point over at least one period 52. For example, in one embodiment, a set of 5 periods may be applied. The waveform may additionally be averaged over the positive and negative semi-periods, or signals. These elements of averaging may be applied to obtain the off-set signal. The resulting DC signal may then be subtracted from each measurement point over the set of periods 52, whereby the off-set signal may be subtracted from each point.

The digitized dB/dt signal from the ADC may be integrated over the entire period (i.e. the on-time and off-time) to produce the B-field 54. This integration may start from an arbitrary point of the cycle. To obtain the integrating constant, the binned signal may be averaged over at least one period. This may be achieved in a point-to-point manner, whereby an averaging over the positive and negative semi-periods 56 occurs. The resulting DC signal, which may be an integrating constant, may then be subtracted from each measurement point over the set of periods 56.

As an additional step, the digital signal may be binned into gates 58 during the off-timer period. For example, in one embodiment of the present invention 24 gates having equal or substantially equal time intervals in the logarithmic scale may be utilized. The logarithmic scale may include bins from 50 us to 10 ms, separated by steps of approximately 1 db.

In one embodiment of the present invention, the integration of the dB/dt signal may be achieved in real time via microprocessors of the data acquisition system. In another embodiment of the present invention, the integration of the dB/dt signal may be performed post flight in accordance with the recorded time series of digitized points.

In the absence of conductive materials in the vicinity, the measured waveform for the B-field should have the same waveform as the current applied to the transmitter coil. Deviations from the waveform of the current applied to the transmitter coil may therefore be analyzed to determine the presence of conductive materials in the ground via standard techniques. Processing and displaying the data as a function of position via standard techniques may produce contour maps showing conductive materials in the ground.

The measurement of the B field, as disclosed herein, enables use of the signal to be maintained within the ADC dynamic range. This in turn, enables SNR to be improved by means of amplification of the receiver coil signal.

It will be appreciated by those skilled in the art that other variations of the embodiments described herein may also be practiced without departing from the scope of the invention. In particular variations of the size, frequency and other suggested measurements may be applied in embodiments of the present invention as the measurements stated are provided by way of example only. Other modifications are therefore possible. For example, the size of the bucking coil may be varied to affect the primary field at the receiver. If the ADC can digitize both the on-time and off-time signals with sufficient resolution to maintain the signal to noise ratio, varying the size of the bucking coil can cause the primary field at the receiver coil to be a value other than approximately zero. Additionally, the size of the bucking coil can control the effect of a change in the number of turns in the transmitter coil, whereby altering the size of the bucking coil can aid in the maintenance of an approximate zero EM field during the on-time of the transmitter current.

The invention claimed is:

1. A time domain electromagnetic (TDEM) geophysical survey system for producing a B-field measurement, comprising:
    (a) a transmitter coil;
    (b) a semi-rigid bucking coil positioned in a substantially concentric and coplanar orientation relative to the transmitter coil;
    (c) a receiver coil positioned in a substantially concentric and coplanar orientation relative to the bucking coil;
    (d) an electrical current source connected to the transmitter coil and bucking coil for applying a periodic current thereto; the transmitter coil, bucking coil and receiver coil being positioned relative to each other such that, at the location of the receiver coil, a magnetic field generated by the bucking coil has a cancelling effect on a primary magnetic field generated by the transmitter coil; and
    (e) a data collection system configured to receive a magnetic field time-derivative signal dB/dt from the receiver coil and integrate the magnetic field time derivative signal dB/dt to generate a magnetic B-field measurement.

2. A HTEM system to produce a B-field measurement comprising:
    (a) a transmitter coil;
    (b) a bucking coil positioned in a substantially concentric and coplanar orientation relative to the transmitter coil;
    (c) a receiver coil positioned in a substantially concentric and coplanar orientation relative to the bucking coil;
    (d) an electrical current connected to the transmitter coil and bucking coil; and wherein a dB/dt signal is produced by the receiver coil for generation of a B-field measurement;
    (e) one or more radial cables wherein the transmitter coil, the bucking coil and the receiver coil are connected by such radial cables so as to maintain generally their substantially concentric and coplanar orientation relative to one another;
    (f) an external suspension system of one or more external cables releasably connected to the transmitter frame;
    (g) one or more suspension attachment cables attached to the external suspension system, the one or more suspension attachment cables being attachable to an aircraft;

wherein the transmitter coil, the bucking coil and the receiver coil are suspended when the aircraft is in flight for electromagnetic measurement enabling generation of the B-field.

3. A system to produce a B-field measurement of claim 1 further comprising or being linked or linkable to an aircraft that is a helicopter, single engine airplane, or other aircraft capable of supporting the weight of the HTEM system apparatus in flight.

4. A system to produce a B-field measurement of claim 1 comprising one or more suspension attachment cables and an external suspension system capable of a suspending the electromagnetic measurement apparatus in a substantially horizontal position when submitted to drag produced by the wind, the weight of the HTEM system and the external suspension system configuration during flight.

5. A system to produce a B-field measurement of claim 1 comprising an external suspension system formed of a mesh of cables.

6. A HTEM system to produce a B-field measurement comprising:
(a) a transmitter coil;
(b) a bucking coil positioned in a substantially concentric and coplanar orientation relative to the transmitter coil;
(c) a receiver coil positioned in a substantially concentric and coplanar orientation relative to the bucking coil; and
(d) an electrical current connected to the transmitter coil and bucking coil; and wherein a dB/dt signal is produced by the receiver coil for generation of a B-field measurement;
the transmitter coil and bucking coil encompassing turns of wire whereby the electrical current passes through the transmitter coil to the bucking coil electrically connected thereto, the electrical connection being achieved in series and having currents circulating in opposite directions.

7. A HTEM system to produce a B-field measurement comprising:
(a) a transmitter coil;
(b) a bucking coil positioned in a substantially concentric and coplanar orientation relative to the transmitter coil;
(c) a receiver coil positioned in a substantially concentric and coplanar orientation relative to the bucking coil; and
(d) an electrical current connected to the transmitter coil and bucking coil; and wherein a dB/dt signal is produced by the receiver coil for generation of a B-field measurement;
wherein the centre of the transmitter coil and of the bucking coil presents a magnetic field that is proportional to the electrical current direction and the number of wire turns, and inversely proportional to the overall size of the coils, thereby forming a substantially concentric system having a primary magnetic field that when measured at the receiver coil is substantially zero.

8. A system to produce a B-field measurement of claim 1 wherein the application of electric current to the transmission coil and the bucking coil cause a positive on-period and an off-period, followed by a negative on-period and off-period, the bucking coil having the effect of reducing the on-period signal to the same level as the off-period signal such that SNR is improved by amplifying the receiver coil signal.

9. A system to produce a B-field measurement of claim 1 further comprising a signal processing means that facilitates the storage of B-field measurements, thereby enabling generation of reports, including contour maps.

10. An electromagnetic measurement data acquisition system comprising:

(a) a receiver coil positioned within a bucking coil which is further positioned within a transmitter coil, each coil being substantially concentric to the other said coils and being electrically connected, whereby a receiver coil signal is obtained;
(b) a low-noise pre-amplifier whereby the receiver coil signal is amplified to produce a dB/dt signal;
(c) a low-pass anti-aliasing filter whereby the dB/dt signal may be filtered;
(d) an ADC whereby the filtered signal may be digitized; and
(e) a signal processing means, included in the system or linked to the system, to produce a B-10 field measurement wherein the signal processing means is operable to enable:
(i) elimination of a pre-amplifier set-off and temperature-dependent drifts by averaging the signal at a given point of a waveform point-by-point over a set of periods;
(ii) averaging of the waveform over one or more positive and negative semi-periods or signals to obtain an offset signal; and
(iii) integration of the signal over the entire period to produce the B-field measurement.

11. An electromagnetic measurement data acquisition system of claim 10 wherein:
(a) a waveform of the current applied to the transmitter coil is obtained;
(b) the transmitter coil current waveform and the B-field waveform are compared; and
(c) any deviations from the transmitter coil current waveform in the B-field waveform are detected, thereby enabling the detection of in-ground conductive materials.

12. An electromagnetic measurement data acquisition system of claim 10, wherein the signal processing means permits the B-field measurement to include the entire period of a waveform of the electrical connection applied to the transmitter coil and the bucking coil.

13. An electromagnetic measurement data acquisition system of claim 10 wherein the concentrically positioned receiving coil, bucking coil, and transmitter coil are incorporated in a VTEM system.

14. An electromagnetic measurement data acquisition system of claim 13 wherein the dB/dt signal is a peak-to-peak signal.

15. An electromagnetic measurement data acquisition system of claim 10 wherein the ADC is a bipolar ADC.

16. An electromagnetic measurement data acquisition system of claim 10 wherein the stored B-field measurement may be utilized to produce a contour map.

17. A signal processing method to produce a B-field measurement comprising:
(a) obtaining a receiver coil signal from a receiver coil positioned within a bucking coil which is further positioned within a transmitter coil, each coil being positioned in substantially concentric orientation relative to the others and being electrically connected with one another to produce the receiver coil signal;
(b) continuously digitizing the receiver coil signal by way of a ADC that filters the signal;
(c) obtaining the digitized signal by a signal processing means unit;
(d) eliminating pre-amplifier set-off and temperature-dependent drifts by averaging the signal at a given point of a waveform point-by-point over a set of periods;

(e) averaging the waveform over one or more positive and negative semi-periods or signals to obtain an off-set signal;
(f) optionally subtracting a resulting digital signal from each point;
(g) integrating the digital signal over at least one entire period so as to produce the B-field measurement; and
(h) binning the digital signal into gates with substantially equal time intervals in a logarithmic scale.

18. A signal processing method to produce a B-field measurement of claim 17 further comprising the steps of:
(a) obtaining a waveform of the current applied to the transmitter coil;
(b) comparing the transmitter coil current waveform and the B-field waveform; and
(c) determining any deviations from the transmitter coil current waveform in the B-field waveform to determine the presence of conductive materials in the ground.

19. A signal processing method to produce a B-field measurement of claim 17 further comprising the steps of:
(a) processing B-field measurement; and
(b) displaying the processed B-field measurement as a function of position to produce contour maps showing conductive materials in the ground.

* * * * *